US010365621B2

(12) United States Patent
Yamada et al.

(10) Patent No.: US 10,365,621 B2
(45) Date of Patent: Jul. 30, 2019

(54) SERVER APPARATUS, CONTROL SYSTEM, AND CONTROL METHOD

(71) Applicant: Sharp Kabushiki Kaisha, Sakai, Osaka (JP)

(72) Inventors: Yuhsuke Yamada, Sakai (JP); Misuzu Kawamura, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 276 days.

(21) Appl. No.: 15/316,528

(22) PCT Filed: Mar. 25, 2015

(86) PCT No.: PCT/JP2015/059079
§ 371 (c)(1),
(2) Date: Dec. 6, 2016

(87) PCT Pub. No.: WO2015/190154
PCT Pub. Date: Dec. 17, 2015

(65) Prior Publication Data
US 2017/0146969 A1    May 25, 2017

(30) Foreign Application Priority Data

Jun. 11, 2014   (JP) ................................. 2014-120358

(51) Int. Cl.
*G05B 15/02*  (2006.01)
*H04L 12/28*  (2006.01)
(Continued)

(52) U.S. Cl.
CPC ........... *G05B 15/02* (2013.01); *G05B 19/042* (2013.01); *G06F 13/00* (2013.01); *G08C 17/02* (2013.01);
(Continued)

(58) Field of Classification Search
None
See application file for complete search history.

(56) References Cited

U.S. PATENT DOCUMENTS

| 8,350,694 B1 * | 1/2013 | Trundle | G08B 25/08 340/539.11 |
| 10,048,665 B2 * | 8/2018 | Hoshi | G08C 17/02 |

(Continued)

FOREIGN PATENT DOCUMENTS

| JP | 2012-133764 A | 7/2012 |
| JP | 2012-173860 A | 9/2012 |

(Continued)

*Primary Examiner* — Qing Yuan Wu
(74) *Attorney, Agent, or Firm* — ScienBiziP, P.C.

(57) ABSTRACT

A server apparatus includes a terminal-side receiver for receiving, via a first network, information including appliance information that identifies an electric appliance, from a terminal apparatus operable by a user, an appliance-side receiver for receiving, via a second network, information including an identifier of the electric appliance and information about a state of the electric appliance, and a storage unit that stores the appliance information received by the terminal-side receiver and the identifier of the electric appliance, for which it is judged, from the information about the state of the electric appliance received by the appliance-side receiver, that the appliance state has been changed, in association with each other, upon reception of trigger information by the terminal-side receiver.

4 Claims, 10 Drawing Sheets

(51) Int. Cl.
*H04M 11/00* (2006.01)
*G06F 13/00* (2006.01)
*H04Q 9/00* (2006.01)
*G08C 17/02* (2006.01)
*H04L 12/413* (2006.01)
*H04L 29/08* (2006.01)
*G05B 19/042* (2006.01)

(52) U.S. Cl.
CPC ...... *H04L 12/2816* (2013.01); *H04L 12/2818* (2013.01); *H04L 12/413* (2013.01); *H04L 67/12* (2013.01); *H04M 11/00* (2013.01); *H04Q 9/00* (2013.01); *G05B 2219/163* (2013.01); *G05B 2219/2642* (2013.01)

(56) References Cited

U.S. PATENT DOCUMENTS

| | | | | |
|---|---|---|---|---|
| 2014/0248802 A1* | 9/2014 | Hieda | ............... | H04L 12/2818 439/620.01 |
| 2015/0220072 A1* | 8/2015 | Hirayama | ............. | G05B 15/02 700/17 |

FOREIGN PATENT DOCUMENTS

| | | |
|---|---|---|
| JP | 2013-243555 A | 12/2013 |
| WO | 2013/179671 A1 | 12/2013 |

\* cited by examiner

FIG.7
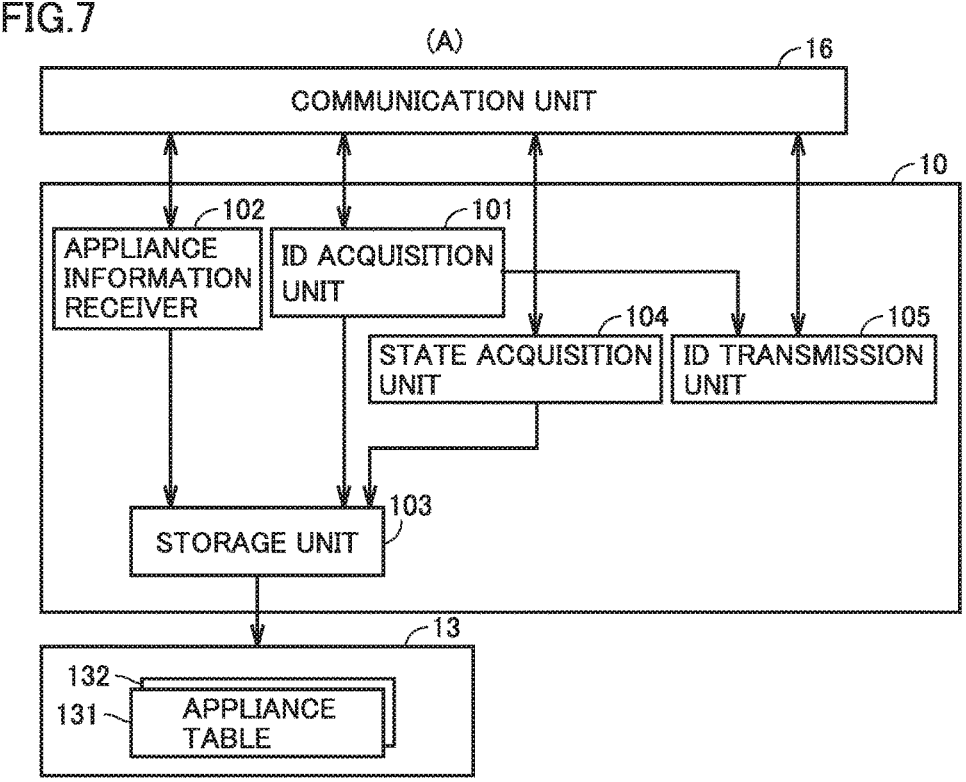
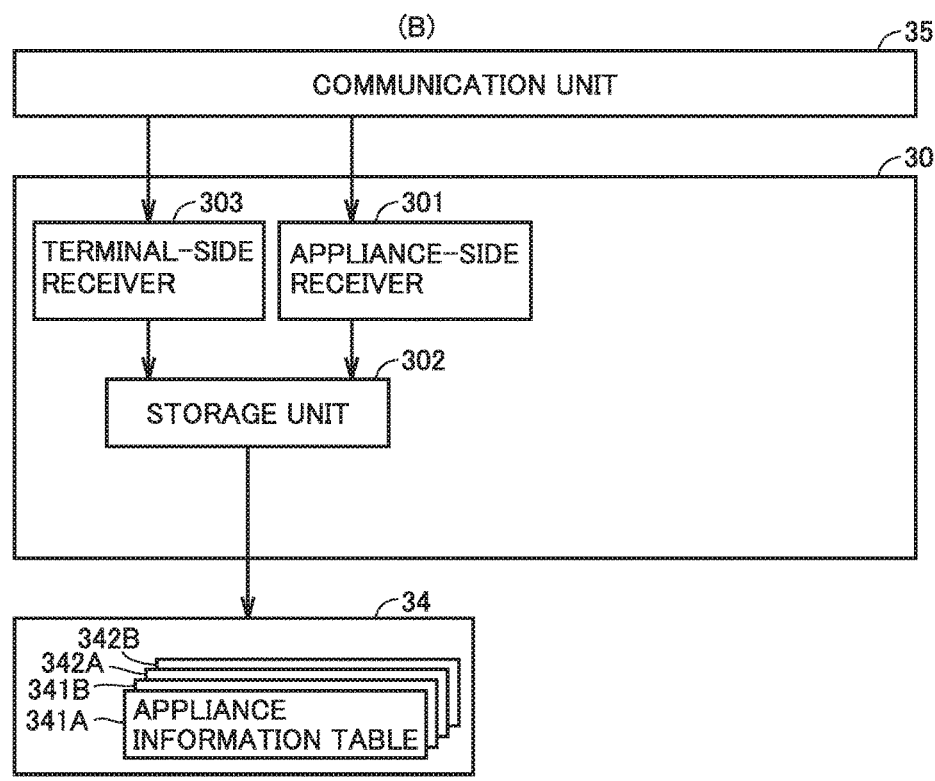

| No. | ID | MONITORING PROPERTY | STATE |
|---|---|---|---|
| 1 | ID10 | ... | ... |
| 2 | ... | ... | ... |
| 3 | ... | ... | ... |

(A)

⇩

| No. | ID | MONITORING PROPERTY | STATE |
|---|---|---|---|
| 1 | ID10 | POWER CONSUMPTION | △△ |
| 2 | ... | ... | ... |
| 3 | ... | ... | ... |

| No. | ROOM NAME | APPLIANCE NAME | ID |
|---|---|---|---|
| 1 | ... | ... | ID10 |
| 2 | ... | ... | ... |
| 3 | ... | ... | ... |

(B) 342B

| ID | MONITORING PROPERTY | STATE |
|---|---|---|
| ID10 | ... | ... |
| ... | ... | ... |
| ... | ... | ... |

⇩

(C) 342A

| No. | ROOM NAME | APPLIANCE NAME | ID |
|---|---|---|---|
| 1 | LIVING ROOM | TELEVISION | ID10 |
| 2 | ... | ... | ... |
| 3 | ... | ... | ... |

⇩

(D) 342B

| ID | MONITORING PROPERTY | STATE |
|---|---|---|
| ID10 | POWER CONSUMPTION | △△ |
| ... | ... | ... |
| ... | ... | ... |

FIG.14

| No. | ID | MONITORING PROPERTY | STATE |
|---|---|---|---|
| 1 | ID10 | POWER CONSUMPTION | △△ |
| 2 | ID11 | POWER CONSUMPTION | ○○ |
| 3 | ... | ... | ... |

| No. | ROOM NAME | APPLIANCE NAME | ID |
|---|---|---|---|
| 1 | LIVING ROOM | TELEVISION | ID10 |
| 2 | KITCHEN | REFRIGERATOR | ID11 |
| 3 | ... | ... | ... |

(B) 342B

| ID | MONITORING PROPERTY | STATE |
|---|---|---|
| ID10 | POWER CONSUMPTION | △△ |
| ID11 | POWER CONSUMPTION | ○○ |
| ... | ... | ... |

SERVER APPARATUS, CONTROL SYSTEM, AND CONTROL METHOD

TECHNICAL FIELD

The present invention relates to a server apparatus, a control system, and a control method, and particularly relates to a server apparatus, a control system, and a control method for remotely operating and monitoring an appliance by using a terminal apparatus.

BACKGROUND ART

Various techniques of remotely operating and monitoring an electric appliance, such as a home electric appliance including an air conditioning device or lighting equipment, by using a terminal apparatus such as a smartphone or a tablet have been proposed. In such a control system, generally, the electric appliance has a communication function and is able to communicate with a server directly or via a HEMS controller, and the terminal apparatus gives a control instruction via the server. The HEMS controller refers to a controller that is used for a home energy management system (HEMS) which performs, for example, appliance control for visualizing household power consumption and power saving (reduction in carbon dioxide emission), and control of renewable energy of a solar generator or the like and a capacitor.

As one example of such remote operation and monitoring, a controller of Japanese Unexamined Patent Application Publication No. 2012-133764 (hereinafter, referred to as PTL 1) makes a user aware of use amount of electricity by outputting information about power consumption of an appliance, which is acquired by remote monitoring. A controller of Japanese Unexamined Patent Application Publication No. 2012-173860 (hereinafter, referred to as PTL 2) judges whether or not an operation state of a home electric appliance is favorable by remote monitoring.

CITATION LIST

Patent Literatures

PTL 1: Japanese Unexamined Patent Application Publication No. 2012-133764
PTL 2: Japanese Unexamined Patent Application Publication No. 2012-173860

SUMMARY OF INVENTION

Technical Problem

A control system in which when an electric appliance is remotely monitored or operated by using a terminal apparatus such as a smartphone or a tablet, the terminal device operates and monitors the desired electric appliance via a server and a HEMS controller has been proposed. When a user remotely operates and monitors the desired electric appliance with the terminal apparatus, it is necessary to detect the electric appliance desired by the user among electric appliances capable of communication with the HEMS controller and prepare information associating both of them in advance. However, no technique for such association is proposed in PTL 1 or 2.

Thus, an object of the invention is to provide a server apparatus, a control system, and a control method, which are able to acquire information associating electric appliances connected to the control system with an electric appliance which is desired by a user and to be remotely operated and monitored among them.

Solution to Problem

A server apparatus according to one aspect of the invention includes: a terminal-side receiver for receiving, via a first network, information including appliance information that identifies an electric appliance, from a terminal apparatus operable by a user; an appliance-side receiver for receiving, via a second network, information including an identifier of the electric appliance and information about a state of the electric appliance; and a storage unit that stores the appliance information received by the terminal-side receiver and the identifier of the electric appliance, for which it is judged, from the information about the state of the electric appliance received by the appliance-side receiver, that the appliance state has been changed, in association with each other, upon reception of trigger information by the terminal-side receiver.

Preferably, the first network is a server-client network in which the terminal apparatus serves as a client and the server apparatus serves as a server.

A control system according to another aspect of the invention is a control system including a terminal apparatus operable by a user and a server apparatus, in which the server apparatus includes: a terminal-side receiver for receiving, via a first network, information including appliance information that identifies an electric appliance, from the terminal apparatus; an appliance-side receiver for receiving, via a second network, information including an identifier of the electric appliance and information about a state of the electric appliance; and a storage unit that stores the appliance information received by the terminal-side receiver and the identifier of the electric appliance, for which it is judged from the information about the state of the electric appliance received by the appliance-side receiver, that the appliance state has been changed, in association with each other, upon reception of trigger information by the terminal-side receiver.

According to another aspect of the invention, in a control method of a control unit that performs control so that information that identifies an electric appliance and an identifier of the electric appliance are stored in a memory in association with each other, information including appliance information that identifies an electric appliance is received via a first network from a terminal apparatus operable by a user, an identifier of the electric appliance and information about a state of the electric appliance are received via a second network, and the received appliance information and the identifier of the electric appliance, for which it is judged, from the information about the state of the electric appliance, that the appliance state has been changed, are stored in a memory in association with each other, upon reception of trigger information via the first network.

Advantageous Effects of Invention

According to the invention, it is possible to acquire information associating electric appliances which communicate with a control system with an electric appliance which is desired by a user and to be remotely operated and monitored among them.

BRIEF DESCRIPTION OF DRAWINGS

FIGS. 7(A) and (B) illustrate a functional configuration of the HEMS controller and the server according to the present embodiment.

FIGS. 12(A) and (B) illustrate an example of a tap table according to the present embodiment.

FIGS. 13(A) to (D) illustrate an example of a tap information table according to the present embodiment.

FIG. 14 illustrates another example of a tap table according to the present embodiment.

FIGS. 15(A) and (B) illustrate another example of a tap information table according to the present embodiment.

DESCRIPTION OF EMBODIMENTS

Figure 1:
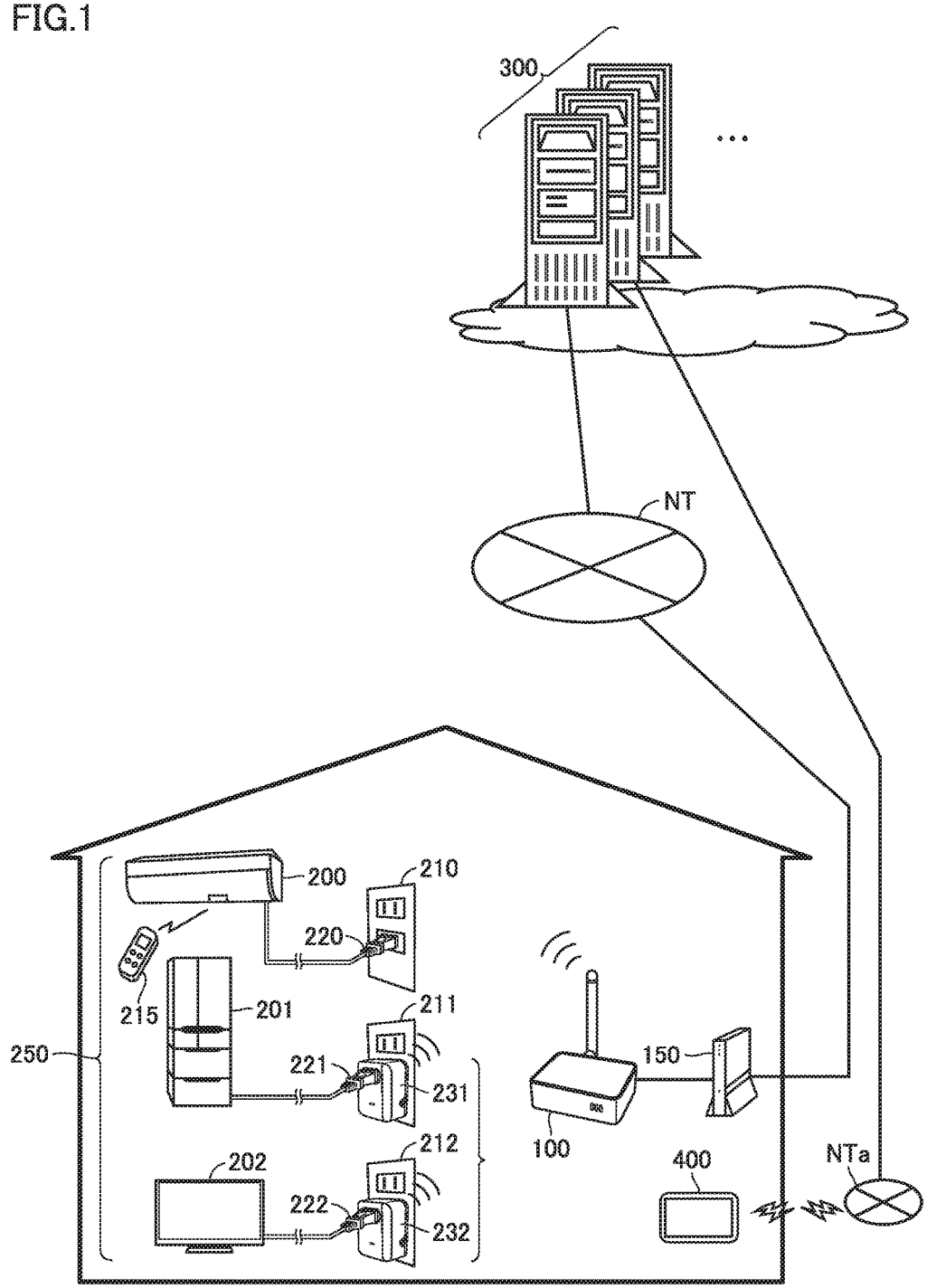
FIG. 1 illustrates a specific example of a configuration of a control system according to the present embodiment.

Embodiments of the disclosure will hereinafter be described with reference to drawings. In the following description, the same components are denoted by the same reference numerals. They have the same names and functions. Therefore, detailed description thereof will not be repeated.

In the present embodiment, an electric appliance includes a power consumption measuring device and an appliance to be controlled. The appliance to be controlled includes a household electric appliance used in a building and indicates an electric appliance driven by power supplied from outside. Further, the building indicates, for example, a house, an office, or the like.

<Outline of Embodiment>

A control system according to the present embodiment is used to remotely operate and monitor an appliance to be controlled (household electric appliance 250 described below) or a measuring device (tap 230 described below) in a building by using a terminal apparatus (terminal apparatus 400 described below) such as a smartphone or a tablet. The terminal apparatus acquires information of a state of the appliance to be controlled (such as an operation state) or power consumption measured by the measuring device to display it on a screen.

When operating the control system, electric appliances actually connected to the control system and an electric appliance to be remotely operated and monitored by a user need to be distinguished and uniquely associated with each other, that is, information of both of them needs to be linked. In the present embodiment, a configuration for such linkage will be mainly described.

First Embodiment

<System Configuration>

FIG. 1 illustrates a specific example of a configuration of a control system according to the present embodiment. With reference to FIG. 1, the control system includes a server 300 and a system in a building. The system in the building includes household electric appliances of an air conditioner (air conditioning device) 200, a refrigerator 201, and a television set 202, a HEMS controller 100 for relaying communication with the server 300 via a network NT (corresponding to a second network) such as the Internet, a broadband router 150, and a terminal apparatus 400 portable by a user. The terminal apparatus 400 may be a stationary computer terminal. The terminal apparatus 400 is able to communicate with the server 300 outside the building or with the system in the building via a network NTa (corresponding to a first network). Here, the air conditioner 200 is able to be controlled also by a remote controller 215.

In FIG. 1, three household electric appliances of the air conditioning device (hereinafter, referred to as an air conditioner) 200, the refrigerator 201, and the television set 202 are illustrated, but these are mere illustrations and a plurality of (a plurality of types of) household electric appliances 250 can exist. Here, the air conditioner 200, the refrigerator 201, and the television set 202 are collectively referred to as the household electric appliances 250 in some cases.

The server 300 may be constituted by a plurality of servers which function in cooperation with each other to perform processing described below by sharing the processing, or may be constituted by one server. The server 300 may be constituted by a typical computer, and is able to communicate with an indoor system via the network NT and communicate with the terminal apparatus 400 via the different network NTa.

The network NTa of FIG. 1 is a network including a communication line network of a mobile phone and constructs a server-client model in which the server 300 serves as a server and the terminal apparatus 400 serves as a client. A network of the server-client model has been already generalized and thus not described in detail. Since the network NTa forms the server-client model as described above, the server operates to perform actual processing in response to a processing request from the client and return a result thereof to the client. Thus, unless special processing is performed, while the terminal apparatus 400 which is the client is able to transmit data at certain timing to the server 300, the server 300 is not able to transmit data at certain timing.

Similarly, the network NT is the Internet and constructs a server-client model in which the server 300 serves as a server and the HEMS controller 100 serves as a client. However, differently from the network NTa, the network NT of the present embodiment is based on the server-client model, but allows communication with the HEMS controller 100 on the client side at certain timing from the server 300 by performing special processing.

The HEMS controller 100 and each of the household electric appliances 250 are connected to the broadband router 150, and form the same subnet (network segment). The broadband router 150 has at least a wired LAN (Local Area Network) and is connected to the HEMS controller 100 with the wired LAN. Preferably, the broadband router 150 further includes a wireless LAN, and is connected to the household electric appliances 250 via the wireless LAN (or the wired LAN). The HEMS controller 100 is able to be connected to a plurality of household electric appliances 250

(via the broadband router 150). The HEMS controller 100 is able to be connected to the network NT (via the broadband router 150) and communicates with the server 300 via the network NT.

The HEMS controller 100 also communicates with taps 231 and 232 which are measuring devices. The refrigerator 201 is connected to the tap 231 and the television set 202 is connected to the tap 232. A power plug 221 of the refrigerator 201 is inserted into a socket of the tap 231. A power plug 222 of the television set 202 is inserted into a socket of the tap 232. No tap is connected to the air conditioner 200 and a power plug 220 is inserted into a power outlet 210. The power outlet corresponds to a plug insertion port for supplying power to an electric appliance.

The taps 231 and 232 are respectively attached to power outlets 211 and 212 to be fed. Thereby, the household electric appliances 250 connected to the taps are also fed.

Each of the taps 231 and 232 has a function of measuring power consumption of the household electric appliance 250 connected thereto and a communication function with the HEMS controller 100. For example, the tap 231 measures power consumption of the refrigerator 201 and the tap 232 measures power consumption of the television set 202. Each of the taps 231 and 232 transmits the measured power consumption to the HEMS controller 100. For convenience of description, a tap 230 is used when the taps 231 and 232 are not distinguished from one another. Note that, the air conditioner 200 is not connected to the tap 230, but has a function of measuring its power consumption as described below and transmits the measured power consumption to the HEMS controller 100.

Here, the HEMS controller 100 carries out wireless communication with the household electric appliances 250 and the tap 230 by means of ZigBee (registered trademark), but the communication is not limited to the ZigBee communication. For example, communication may be carried out in a wireless manner such as Wifi (registered trademark) or by means of a wired LAN (Local Area Network), and the like.

<Configuration of HEMS Controller>

Figure 2:
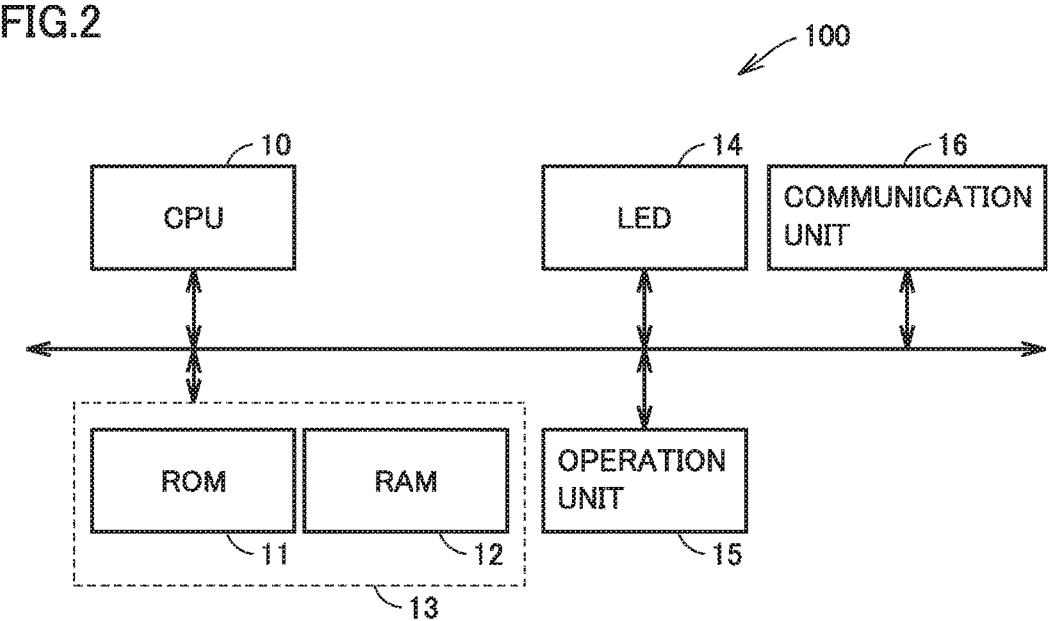
FIG. 2 is a block diagram illustrating a schematic example of a device configuration of a HEMS controller according to the present embodiment.

FIG. 2 is a block diagram illustrating a schematic example of a device configuration of the HEMS controller 100. With reference to FIG. 2, the HEMS controller 100 includes a CPU (Central Processing Unit) 10 for controlling a whole of the device. The HEMS controller 100 further includes a memory 13 connected to the CPU 10, a LED (Light Emitting Diode) 14 as an output unit, an operation unit 15 such as a switch, and a communication unit 16. The memory 13 includes, for example, a ROM (Read Only Memory) 11 which is a memory for storing a program executed by the CPU 10, and a RAM (Random Access Memory) 12 which is a memory for storing various data such as state information of an electric appliance described below and serving as a working area when the program is executed by the CPU 10. The communication unit 16 communicates with the household electric appliances 250, the tap 230, the broadband router 150, and the like.

Note that, the device configuration of FIG. 2 is one example in which the device configuration of the HEMS controller 100 is simplified and the device configuration of the HEMS controller 100 is not limited to the configuration of FIG. 2. For example, it may be configured so that communication apparatuses of a main body control device and the household electric appliance 250 are independent from each other and are connected to each other so as to allow communication by using a communication circuit such as a UART (Universal Asynchronous Receiver Transmitter).

<Configuration of Server>

Figure 3:
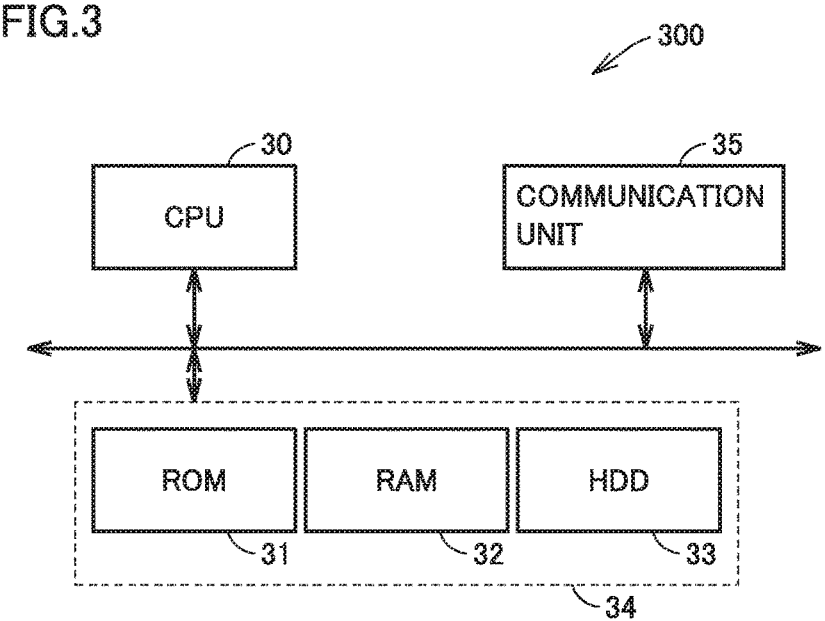
FIG. 3 is a block diagram illustrating a schematic example of a device configuration of a server according to the present embodiment.

FIG. 3 is a block diagram illustrating a schematic example of a device configuration of the server 300. With reference to FIG. 3, the server 300 includes a CPU 30 for controlling a whole of the device. The server 300 also includes a memory 34 connected to the CPU 30, and a communication unit 35 for performing communication via the network NT or NTa. The memory 34 includes, for example, a ROM 31 which is a memory for storing a program executed by the CPU 30, a RAM 32 which is a memory for serving as a working area when the program is executed by the CPU 30 and storing a calculated value, and a HDD (Hard Disk Driver) 33 as one example of a large-sized storage device.

As described above, the server 300 may be constituted by a typical computer. Therefore, FIG. 3 illustrates a schematic configuration of a typical computer. Of course, the configuration of the server 300 is not limited to the configuration of FIG. 3. For example, the server 300 may further include an operation unit or a display for receiving an operation input by a user. Further, when the server 300 is constituted by a plurality of apparatuses as exemplified in FIG. 1, each server may further include a communication apparatus for performing communication with other apparatuses.

<Configuration of Tap>

Figure 4:
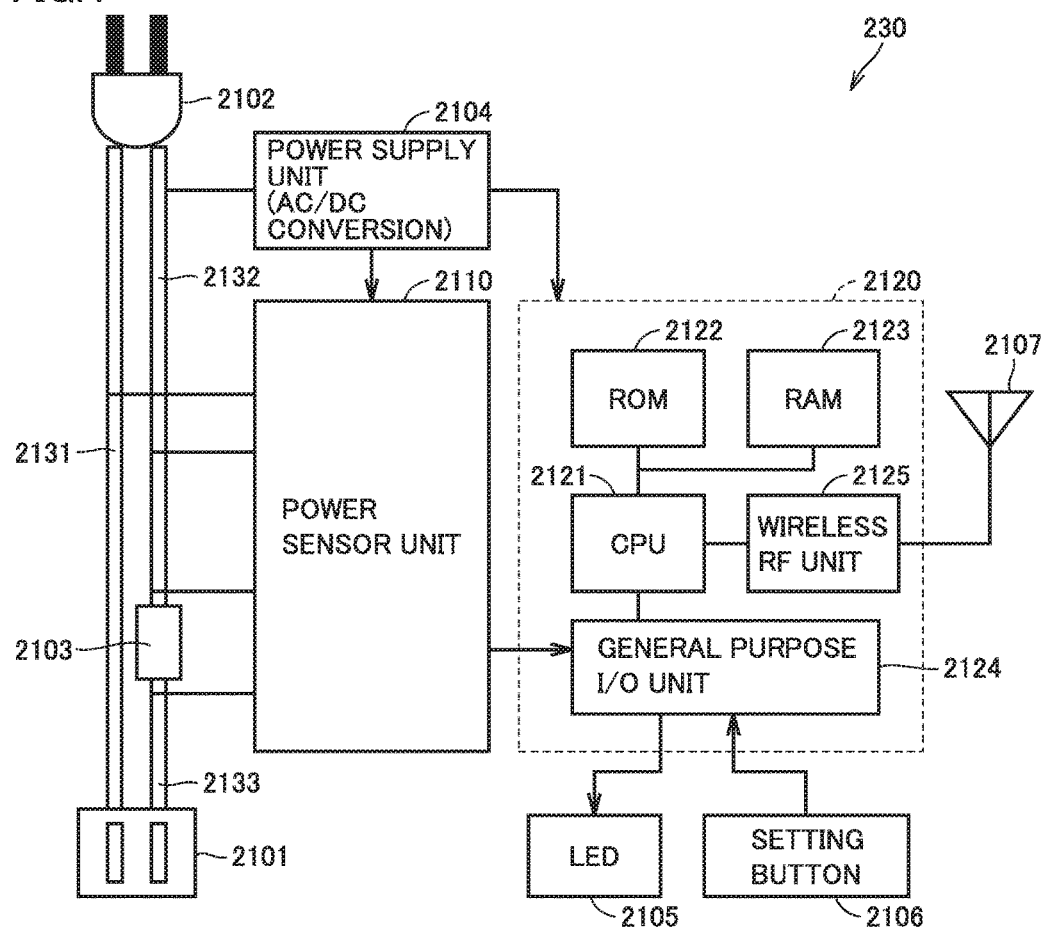
FIG. 4 illustrates a hardware configuration of a tap according to the present embodiment.

FIG. 4 illustrates a hardware configuration of the tap. With reference to FIG. 4, the tap 230 includes a socket 2101 into which a power plug of the corresponding household electric appliance 250 is inserted, a plug 2102 inserted into a power outlet, a shunt resistance 2103, a power supply unit 2104, a LED 2105, a setting button 2106, an antenna 2107, a power sensor unit 2110 for measuring power consumption of the corresponding household electric appliance 250, a wireless RF (Radio Frequency) integrated communication controller unit 2120, a wiring 2131, a wiring 2132, and a wiring 2133.

The wireless RF integrated communication controller unit 2120 includes a CPU 2121, a ROM 2122, a RAM 2123, a GPIO 2124, and a wireless RF unit 2125. In the ROM 2122, for example, a program executed by the CPU 2121 is stored. The LED 2105 and the setting button 2106 are connected to the wireless RF integrated controller unit 2120. Note that, the ROM 2122 is typically constituted by a NV RAM (Non Volatile RAM).

The LED 2105 indicates a data processing state of the tap by means of blinking and/or color of light based on a signal from the CPU 2121. The setting button 2106 is operated to perform setting of the state of the tap or the like by the user, and operation content is output to the CPU 2121.

The power sensor unit 2110 is connected to the wiring 2131 and the wiring 2132, detects a voltage (potential difference) between the two wirings and detects a current value of current flowing through the shunt resistance 2103. For calculating power, the detected voltage value and current value are multiplied, and a digital signal indicating the multiplied value is subjected to digital/frequency conversion. A frequency signal obtained by the conversion is output to the GPIO 2124 of the wireless RF integrated communication controller unit 2120.

The CPU 2121 performs data conversion of the frequency signal acquired from the GPIO 2124, and the wireless RF unit 2125 transmits a signal obtained by the data conversion to the HEMS controller 100 by using the antenna 2107.

The power supply unit 2104 is connected to the wiring 2132, converts alternating-current power acquired from the wiring 2132 into direct-current power, and provides the power sensor unit 2110 and the wireless RF integrated communication controller unit 2120 with the converted power.

<Configuration of Terminal Apparatus>

Figure 5:
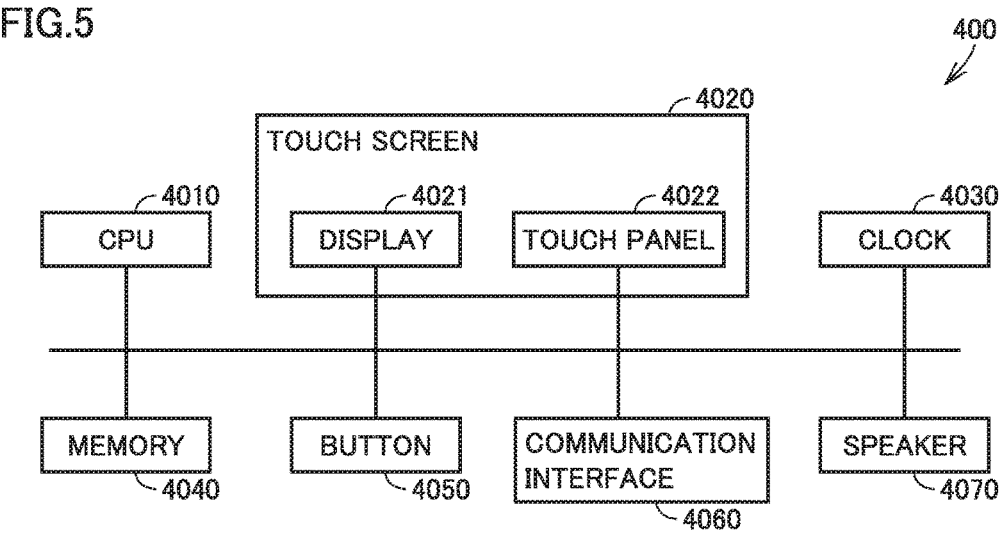
FIG. 5 illustrates a hardware configuration of a terminal apparatus according to the present embodiment.

FIG. 5 illustrates a hardware configuration of the terminal apparatus 400. With reference to FIG. 5, the terminal apparatus 400 includes a CPU 4010, a touch screen 4020, a clock 4030 for clocking time, a memory 4040, a button 4050 such as on/off of a power supply, a communication interface 4060, and a speaker 4070. The touch screen 4020 forms a display integrated input device which is constituted by a display 4021 and a touch panel (tablet) 4022, but may be provided with a display and an operation unit (such as a button or a key) individually instead.

The memory 4040 is realized by various memories, such as a RAM, a ROM, a flash memory, and a hard disk. In the memory 4040, various programs executed by the CPU 4010 and various data read by the CPU 4010 are stored. The CPU 4010 executes various information processing and the like by executing various programs stored in the memory 4040.

By being controlled by the CPU 4010, the communication interface 4060 communicates with the server 300 via the network NTa.

<Configuration of Household Electric Appliance>

Figure 6:
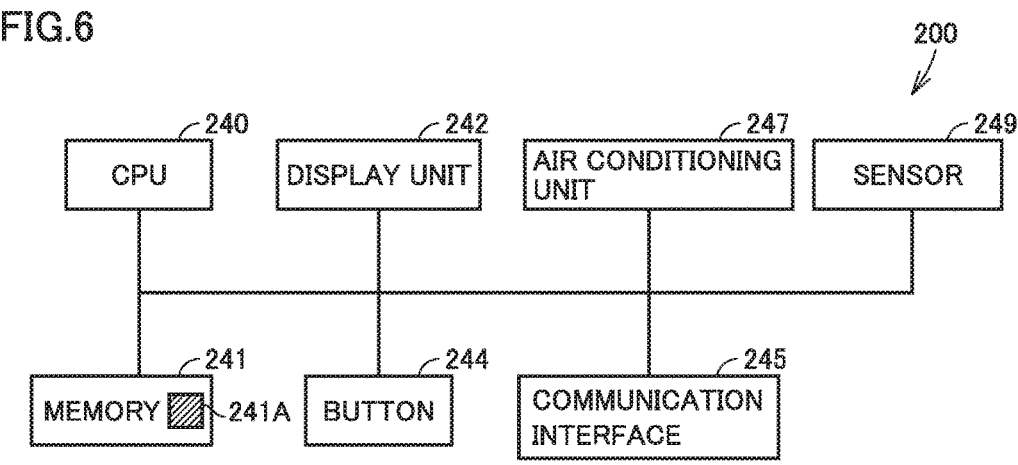
FIG. 6 illustrates a hardware configuration of a household electric appliance according to the present embodiment.

FIG. 6 illustrates a hardware configuration of the household electric appliance 250 according to the present embodiment. In the present embodiment, each of the household electric appliances 250 schematically has a similar configuration. Here, description will be given for the air conditioner 200 as a representative.

With reference to FIG. 6, the air conditioner 200 includes a CPU 240. The air conditioner 200 further includes a memory 241 connected to the CPU 240, a display unit 242 constituted by a LED and the like, a button 244 operated by a user to give a command, a communication interface 245 for performing communication with the HEMS controller 100, an air conditioning unit 247 including a compressor, a motor, and the like, and a sensor 249. The sensor 249 includes a sensor for measuring ambient temperature/humidity and the like, a power sensor for measuring power consumption of the air conditioner 200 itself, and the like.

By being controlled by the CPU 240, the communication interface 245 communicates with the HEMS controller 100 or the remote controller 215. The communication interface 245 has a communication function of a wireless or wired manner. The wireless manner includes a function of LAN, ZigBee (registered trademark), Bluetooth (registered trademark), infrared communication with the remote controller 215, and the like, and the wired manner includes LAN and the like.

Note that, when the air conditioner 200 is connected to the tap 230, a power measurement function by the power sensor unit 2110 of the connected tap 230 is able to be used instead of the function of the power sensor of the sensor 249.

In the memory 241, a control program executed by the CPU 210, a command input to the air conditioner 200, state data 241A indicating a state of the household electric appliance 250, and the like are stored. The control program includes an air conditioning control program for controlling each portion of the air conditioning unit 247.

<State of Household Electric Appliance 250>

Each of the household electric appliances 250 can take some states. The states of an electric appliance also include a state associated with power consumption. Each of the states can be prescribed by one or more types of attribute values for controlling an operation of the electric appliance.

When receiving a control command from the remote controller 215 or from the terminal apparatus 400 via the HEMS controller 100, the electric appliance changes an operation state. The control command includes a power on/off command and a state change command. The state change command includes a target operation amount of an attribute value (temperature, humidity, air quantity, power consumption, and the like).

Upon reception of the control command, the CPU 240 stores an operation amount of the command as the state data 241A of the memory 241. In accordance with this operation amount, the air conditioning control program is executed. Thereby, the air conditioner 200 (more specifically, the air conditioning unit 247) is controlled to be shifted to a target operation state. When the operation state changes, for example, the number of times of rotation of the motor with respect to the compressor varies, resulting that power consumption of the air conditioner 200 changes. The CPU 240 has a function of detecting whether or not the state data 241A has changed from a previous value. Further, a detection result (whether or not there is a state change) is notified (transmitted) to the HEMS controller 100. The state data 241A also includes, for example, presence or absence of timer setting and a time thereof. In a predefined area of the memory 241, data of the measured power consumption is stored.

In this manner, it is possible to change the state by using a value of one or more types of attributes defining the state of the electric appliance and detect whether or not there is a change in the state.

<Identification of Electric Appliance by HEMES Controller>

The HEMS controller 100 and the tap 230 carry out pairing to uniquely identify the tap 230. In the pairing, first, a user slides a not-illustrated slide switch of the controller 100 from a NOP position to a JOIN position. Then, the user presses a push button which is not illustrated. Thereby, the HEMS controller 100 is in a join permitted state for a predefined time (for example, for sixty seconds). Note that, during this time, the CPU 10 causes the LED 14 to emit light in a predefined state. When the user inserts the plug 2102 of the tap 230 into a power outlet (or operates the setting button 2106) in the join permitted state, the pairing of the HEMS controller 100 and the tap 230 is performed. The pairing is performed individually for the tap 231 and the tap 232.

The pairing is performed in a ZigBee network including the HEMS controller 100, the household electric appliances 250, and the tap 230, and the HEMS controller 100 allocates a short address (also referred to as a network address) to each of the tap 231 and the tap 232. The short address is an address whose uniqueness is guaranteed in one ZigBee network. In this manner, the short address is dynamically allocated by the HEMS controller 100 when the tap 230 joins the ZigBee network. Normally, the short address is not changed after being allocated once.

When the short address is allocated by the pairing, the tap 230 stores the short address in a predefined area of the RAM 2123. When performing communication with the HEMS controller 100, the tap 230 uses an address of the HEMS controller 100, which is obtained in advance, and its own address as information for specifying an address and a transmission destination.

For uniquely identifying the household electric appliance 250, the household electric appliance 250 communicates with the HEMS controller 100 in accordance with the ECHONET Lite (registered trademark), and is identified by the HEMS controller 100 (address is allocated). After that, at the time of communication of the household electric appliance 250 and the HEMS controller 100, the address of the HEMS controller 100, which is obtained (stored in the memory 241) in advance, and its own address as information for specifying an address and a transmission destination.

<Functional Configuration>

FIGS. 7(A) and (B) illustrate a functional configuration of the HEMS controller 100 and the server 300 according to the embodiment of the invention. With reference to FIG. 7(A), the HEMS controller 100 for relaying communication between the server 300 and electric appliances includes an ID acquisition unit 101 for acquiring identifiers (ID) of the household electric appliances 250, the tap 230 or the like, an appliance information receiver 102 for receiving appliance information of monitoring properties of the electric appliances by performing communication with the server 300, an appliance table 131 of the memory 13, a storage unit 103 for storing information in a tap table 132 (described below) or the like, an ID transmission unit 105 for transmitting the acquired identifiers of the household electric appliances 250 to the server 300, and a state acquisition unit 104 for acquiring states of the electric appliances by communication. The storage unit 103 stores an appliance identifier acquired by the ID acquisition unit 101, reception information by the appliance information receiver 102, and reception information by the state acquisition unit 104 in the appliance table 131 and the tap table 132 in association with each other for each of the electric appliances.

With reference to FIG. 7(B), the server 300 includes a terminal-side receiver 303 for receiving, via a first network (network NTa), information including appliance information that identifies an electric appliance (such as the household electric appliance 250), from a terminal apparatus 400, an appliance-side receiver 301 for receiving, via a second network (network NT), information including an identifier ID of the electric appliance and information about a state of the electric appliance, and a storage unit 302. When receiving trigger information from the terminal apparatus 400 with the terminal-side receiver 303, the storage unit 302 stores the appliance information received by the terminal-side receiver 303 and the identifier ID of the electric appliance, for which it is judged, from the information about the state of the electric appliance received by the appliance-side receiver 301, that the appliance state has been changed, in association with each other, in the memory 34. In this manner, the association and storage by the storage unit 302 is performed being triggered by a user operation (for example, operation of a "next" button 161 described below) or the like in the terminal apparatus 400, but a timing of the association and storage is not limited to the user operation as long as trigger is able to be provided from the terminal apparatus 400.

The function of FIG. 7(A) is realized by a program executed by the CPU 10 or a combination of a program and a circuit, and the function of FIG. 7(B) is realized by a program executed by the CPU 30 or a combination of a program and a circuit.

<Operation Outline>

Figure 8:
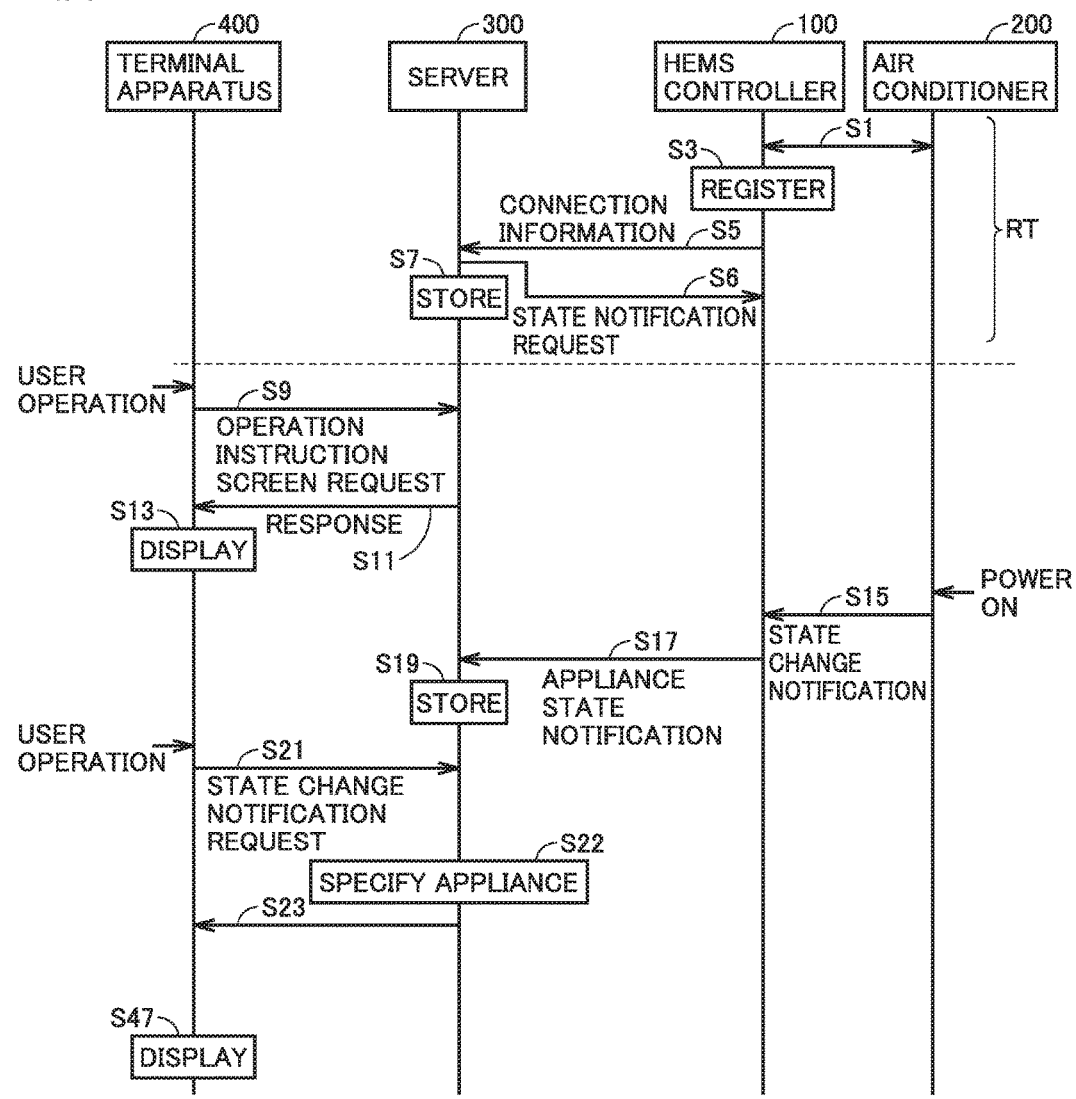
FIG. 8 illustrates a communication sequence according to the present embodiment.

FIG. 8 illustrates a communication sequence according to the embodiment of the invention. In this communication sequence, processing carried out in each of the air conditioner 200 which is one example of an appliance to be controlled, the HEMS controller 100, the server 300, and the terminal apparatus 400 in order to register link information of an electric appliance is indicated in association with communication.

Figure 9:
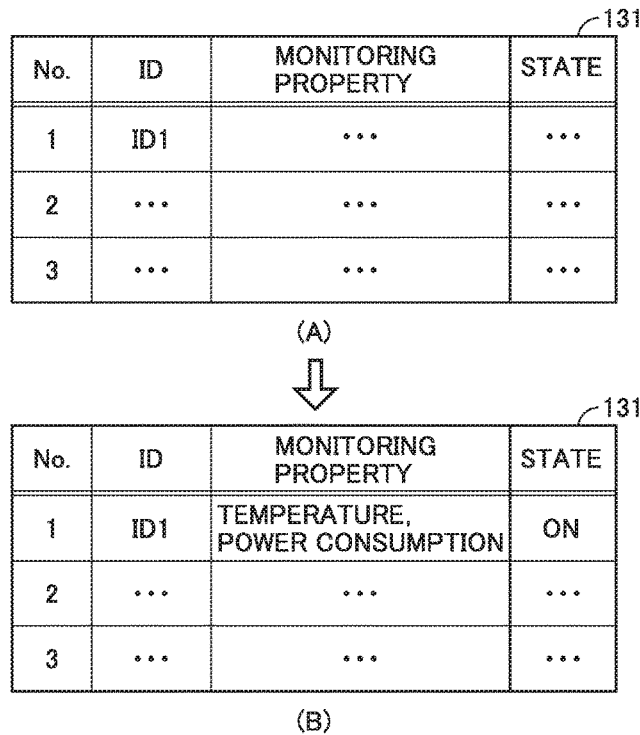
FIGS. 9(A) and (B) illustrate an example of an appliance table according to the present embodiment.

FIGS. 9(A) and (B) illustrate the appliance table 131 of a household electric appliance according to the embodiment of the invention. FIGS. 10(A) to (D) illustrate appliance information tables 341A and 341B according to the embodiment of the invention. The appliance table 131 is stored in a predefined area of the memory 13 of the HEMS controller 100 and the appliance information tables 341A and 341B are stored in a predefined area of the memory 34 of the server 300. These tables will be described below. FIGS. 11(A) and (B) illustrate a screen example according to the embodiment of the invention.

With reference to FIG. 8, linking processing for the air conditioner 200 which is one example of an electric appliance will be described with use of the function of FIG. 7 as appropriate. This processing is realized when a predefined application program is executed in the terminal apparatus 400, the server 300, the HEMS controller 100, and each electric appliance.

First, processing RT is performed. Specifically, the HEMS controller 100 identifies the air conditioner 200 by performing ECHONET Lite communication with the air conditioner 200 (step S1). The ID acquisition unit 101 of the HEMS controller 100 acquires a short address of the air conditioner 200 by the identification, and the storage unit 103 stores it in the appliance table 131 of FIG. 9(A) (step S3).

With reference to FIG. 9(A), the appliance table 131 has one or more records. The records are generated for the respective household electric appliances 250, connection of which is detected, by the processing RT and registered in the appliance table 131. Each of the records includes a record identifier No., an identifier ID (identifier) of the household electric appliance 250 connection of which is detected, a monitoring property (details thereof will be described below), and state data indicating an operation state in association with each other. Here, the identifier ID indicates, for example, a short address of the household electric appliance 250. FIG. 9(A) illustrates a state in which an identifier ID of the household electric appliance 250 (air conditioner 200) connection of which is detected is registered at step S3. Note that, a data storage format of the appliance table 131 is not limited to a method of using records as long as data is able to be associated with each other.

With reference back to FIG. 8, the ID transmission unit 105 of the HEMS controller 100 transmits connection information (checkctrl), which indicates that connection of the new household electric appliance 250 (air conditioner 200) is detected, to the server 300 (step S5). The connection information includes the "identifier ID" registered at step S3. When the appliance-side receiver 301 of the server 300 receives the connection information, the CPU 30 transmits a state notification request (control) (step S6). The state notification request (control) is a signal requesting to perform notification when there is a change in the state of the electric appliance acquired by the state acquisition unit 104 as to the household electric appliance 250 (air conditioner 200) connection of which is detected. Upon reception of the state notification request (control), the CPU 10 of the HEMS controller 100 is able to, when detecting that there is a change in the state acquired by the state acquisition unit 104 as to the household electric appliance 250 (air conditioner 200) connection of which is detected, notify the server 300 of the state change (refer to step S17 described below). In a case of transmitting the state notification request (control), the storage unit 302 of the server 300 registers the "identifier ID" of the received connection information in the appliance information tables 341A and 341B of FIGS. 10(A) and (B) (step S7).

Figure 10:
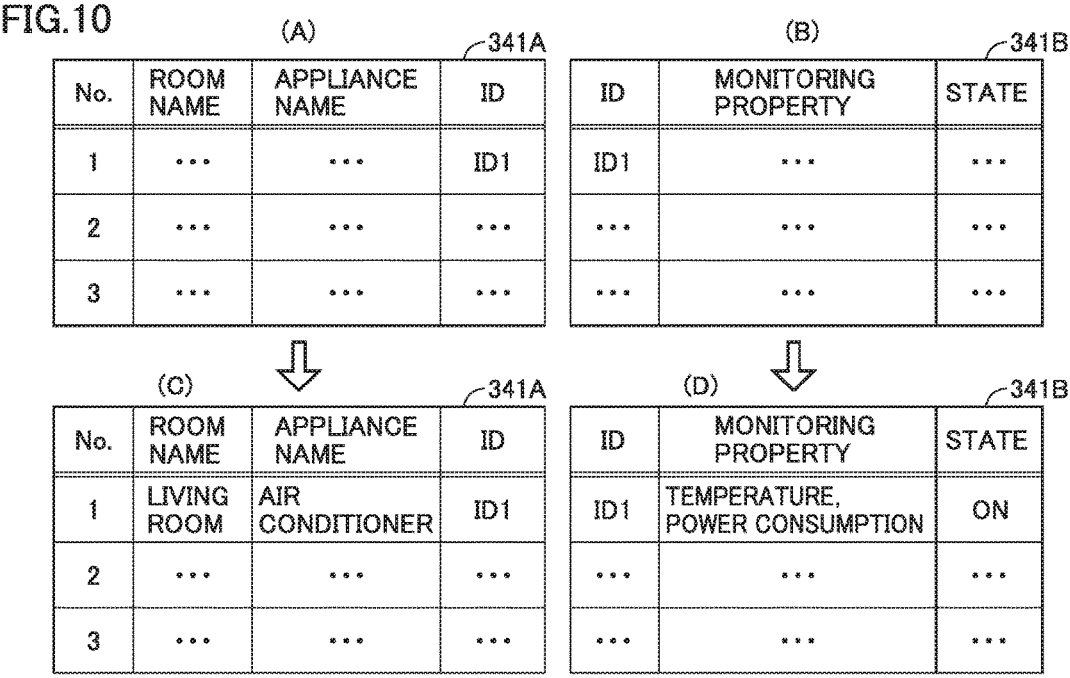
FIGS. 10(A) to (D) illustrate an example of an appliance information table according to the present embodiment.
Figure 11:
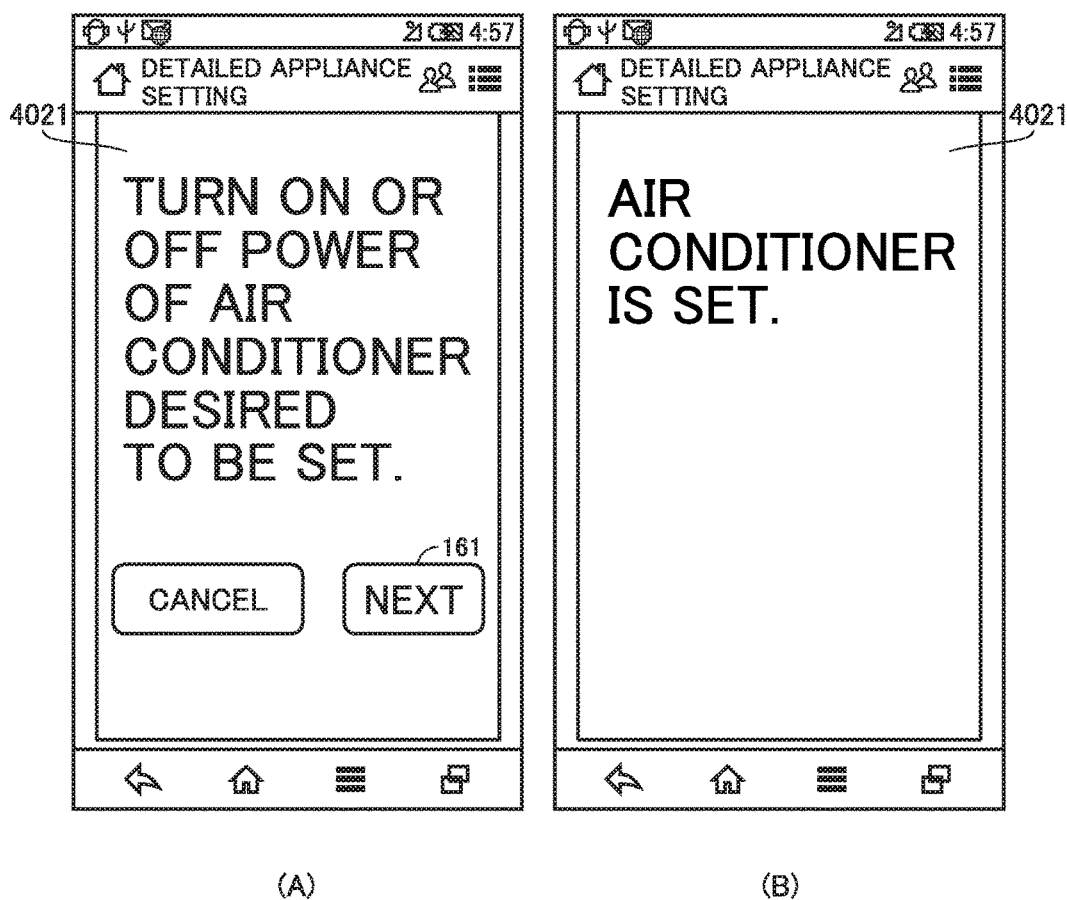
FIGS. 11(A) and (B) illustrate a screen example according to the present embodiment.

With reference to FIGS. 10(A) and (B), the appliance information table is constituted mainly by the table 341A in which information for identifying the household electric appliance 250 and the table 341B in which, for example, a monitoring property of the household electric appliance 250 is stored. Each of the tables has one or more records. The CPU 30 generates records of "identifiers IDs" indicated by connection information received from the HEMS controller 100 and registers them in the appliance information tables 341A and 341B. Each record of the table 341A includes a record identifier No., a received identifier ID, a room name, and an appliance name, and each record of the table 341B includes a received identifier ID, a monitoring property, and state data in association with each other. FIGS. 10(A) and (B) each illustrates a state in which the "identifier ID" received at step S7 is registered. Note that, a data storage format of the appliance information table 341 is not limited to a method of using records as long as data is able to be associated with each other.

Note that, the monitoring property indicates one or more of attributes of operation states (temperature, humidity, air quantity, power consumption, and the like in the case of the air conditioner) which are desired to be monitored with respect to an electric appliance (the air conditioner 200 in this case). Here, it is assumed that, for example, two of temperature and power consumption are input.

Moreover, after inputting appliance information, the user operates the touch screen 4020 to input a request of an air conditioner operation instruction screen. The CPU 4010 transmits the request of the air conditioner operation instruction screen to the server 300 (step S9).

When receiving the request of the air conditioner operation instruction screen, the server 300 transmits a response of air conditioner operation instruction screen data to the terminal apparatus 400 (step S11). The CPU 4010 of the terminal apparatus 400 receives the air conditioner operation instruction screen data, and displays a screen on the basis thereof (refer to FIG. 11(A)) on the display 4021 (step S13).

The user confirming a message of "turn on or off power of air conditioner desired to be set" on a screen of FIG. 11(A) turns on power of the air conditioner 200 by operating the remote controller 215. At this time, the CPU 240 detects a state change in the air conditioner 200 and transmits state change notification of "power on" (step S15).

When receiving the state change notification, the state acquisition unit 104 of the HEMS controller 100 transmits, to the server 300, appliance state notification (check control command) for notifying that the appliance change notification is received (step S17). The appliance-side receiver 301 of the server 300 receives the appliance state notification, and the storage unit 302 searches the table 341B based on the "identifier ID" of the received appliance state notification, and stores the "power on" as state data in the record having the "identifier ID" (step S19).

The user operates a display screen of the touch screen 4020 in the terminal apparatus 400 to input appliance information of the air conditioner 200. The input appliance information includes an appliance name, a room name in which the air conditioner 200 is installed, and a monitoring property. For example, "air conditioner" and "living room" are input respectively as the appliance name and the room name. Subsequently, when the user operates the "next" button 161 on the screen of FIG. 11(A), the CPU 4010 transmits a state change notification request (INF log acquisition API) in order to request notification of a state change of an electric appliance connected to the HEMS controller 100 (step S21).

When the terminal-side receiver 303 of the server 300 receives the state change notification request, the CPU 30 extracts an identifier ID from information of a record whose information (state) is updated most recently in the appliance information table 341B. Then, the extracted identifier ID, and a model name "air conditioner" and the room name "living room" which are input in advance are linked and stored in the table 341A (step S22). The table 341A after the storage is illustrated in FIG. 10(C). When the linking is performed successfully, the success is transmitted to the terminal apparatus 400 (step S23) and displayed on the display 4021. A display screen example is illustrated in FIG. 11(B).

The appliance information receiver 102 of the HEMS controller 100 receives a signal including the monitoring property of the latest record (that is, air conditioner 200), which is read from the appliance information table 341B, from the server 300. The storage unit 103 stores the monitoring property included in the received signal in the record registered in the appliance table 131. Thereby, data of the appliance table 131 is updated from FIG. 9(A) to FIG. 9(B).

The user is able to confirm, from the display screen, that the linking of the appliance information for the air conditioner of the living room whose appliance information is input by the user is performed successfully. That is, when the linking of the appliance information of the air conditioner 200 is completed between the appliance information tables 341A and 341B of the server 300 and the appliance table 131 of the HEMS controller 100, the user is able to confirm that setting of the appliance information for realizing the remote operation and monitoring for the desired air conditioner is performed successfully.

Note that, without limitation to the aforementioned procedure, the linking may be performed in such a manner that, for example, the table 341A in which the model name is "air conditioner", the room name is "living room", and the ID is " . . . " (not illustrated) is prepared at step S7, an identifier ID whose information (state) is updated most recently is recorded as the identifier ID at step S19, and the identifier ID is registered in the table 341A (that is, updated in the table of FIG. 10(C)) at step S22.

In FIG. 8, a required time after the user operates the "next" button 161 (that is, after trigger information of the state change notification request (step S21) is transmitted) until the CPU 4010 of the terminal apparatus 400 receives a response from the server 300 and displays it on the display 4021 (step S47) is prescribed to a predefined length of time period (for example, for one minute). This response is performed to notify that appliance information, such as an attribute type, set to the HEMS controller 100 by the user is transmitted and set to the appliance table 131. Thus, when the server 300 is not able to perform the linking in one minute, the terminal apparatus 400 may be caused to display a predefined screen for error processing.

(Characteristics of Embodiment)

At step S22 of FIG. 8, the CPU 30 determines the appliance 250 corresponding to the extracted identifier ID as the appliance to be associated with the appliance information input by the user. By an operation of saving the appliance information by the user, an acquisition request according to the associated identifier ID and the monitoring property are set. When setting is received by the HEMS controller 100, the CPU 30 stores the appliance information in the tables 341A and 341B.

In the present embodiment, the states of the household electric appliances 250 are acquired at step S21, and the identifier of the household electric appliance 250 whose state has been changed is extracted at step S22. A signal for linking (associating and storing) these pieces of information is transmitted from the terminal apparatus 400 to the server 300 when the "next" button 161 is operated. Being triggered by the reception of the signal from the terminal apparatus 400, the server 300 stores these pieces of information in the tables 341A and 341B in association with each other (refer to FIGS. 10(C) and (D)).

In this manner, being triggered by the signal transmitted when the "next" button 161 is operated in the terminal apparatus 400, the server 300 links the identifier ID of the household electric appliance 250, for which it is judged that the state has been changed, with the appliance information input by the user (an appliance name of "air conditioner", and the room name ("living room") in which the household electric appliance 250 is installed), the monitoring property (including temperature, humidity, air quantity, power consumption, and the like in the case of the air conditioner).

A case where the aforementioned linking is performed by using the network NTa is assumed. In this case, since the network NTa is a network of a server-client model, compared to the present embodiment, load of processing including communication becomes greater when information of the identifier ID of the household electric appliance 250 whose state acquired from the HEMS controller 100 side is judged as being changed is immediately linked with the appliance information input by the user. Specifically, the terminal apparatus 400 such as a mobile terminal needs to inquire, to the server 300, whether or not information of the identifier ID of the household electric appliance 250 whose state is judged as being changed is acquired. In order for the terminal apparatus 400 to detect the state change correctly, the aforementioned inquiry needs to be made frequently. Since it can be assumed that a plurality of users communicate with the server 300 via the network NTa, load on the network NTa or the server 300 becomes great. On the other hand, when the signal by the user operation (operation of the "next" button 161) is used as trigger like in the present embodiment, it is possible to perform linking while reducing an amount of signals for communication and load of internal processing of the server 300.

Additionally, though the server 300 is realized by one apparatus in the present embodiment, when the function of the server 300 of the present embodiment is realized by causing a plurality of servers to cooperate with each other, it can be assumed that a previous functional block for acquiring a state change of an appliance and a functional block for acquiring appliance information input by the user are constructed as different servers. Even when communication between the plurality of servers is constructed with a server-client model, a configuration in which linking is performed being triggered by the signal by the user operation makes it possible to reduce, even in a case where a plurality of servers are used for realization, load of communication between the servers and load of processing in the servers.

Second Embodiment

Though description has been given in the first embodiment for linking for the household electric appliance 250 (air conditioner 200) which is not connected to the tap 230, linking for the tap 230 for connecting the household electric appliance 250 is also able to be performed as follows similarly to the first embodiment. Note that, in a second embodiment, the tap table 132 of FIG. 12, and tap information tables 342A and 342B of FIG. 13 are used for managing appliance information of the tap. Configurations thereof are respectively similar to those of the appliance table 131, and the appliance information tables 341A and 341B. The tap table 132 is stored in a predefined area of the memory 13 of the HEMS controller 100, and the tap information tables 342A and 342B are stored in a predefined area of the memory 34 of the server 300.

First, processing RT is performed. In the processing RT, pairing for the tap 232 to which the television set 202 in the living room is connected is performed by a user operation. Thereby, a tap ID ("ID10") which is an identifier corresponding to a short address allocated to the tap 232 is registered in the tap table 132 of the HEMS controller 100 (refer to FIG. 12(A)), and a tap ID ("ID10") of the tap 232 is similarly registered in each of the tap information tables 342A and 342B of the server 300 (refer to FIGS. 13(A) and (B)). The tap information table 342A indicates a name of the household electric appliance 250 connected to the tap 232 (that is, name "television" of the television set 202). Other configurations of the tap information tables 342A and 342B are similar to those of the appliance information tables 341A and 341B.

Then, similarly to FIG. 8, tap information corresponding to appliance information which is input by operating the terminal apparatus 400 by the user (a room name, a household appliance name, a tap name, a monitoring property of the tap, an electric appliance name connected to the tap) is able to be stored in the tap information tables 342A and 342B in the server 300 and the tap table 132 of the HEMS controller 100 by being linked (associated) with the tap ID with a signal transmitted when the "next" button 161 is operated in the terminal apparatus 400 (refer to FIGS. 13(C) and (D) and FIG. 12(B)) as a trigger.

Then, similarly to the case of the tap 231, linking processing is able to be performed also for the tap 232 to which the refrigerator 201 in a kitchen is connected. Thereby, appliance information of both taps of the taps 231 and 232 is registered in the tap information tables 342A and 342B of the server 300 and the tap table 132 of the HEMS controller 100 (refer to FIG. 14 and FIGS. 15(A) and (B)).

As described above, by registering appliance information in the tap table 132 and the tap information tables 342A and 342B, it is possible to uniquely link appliance information of the household electric appliance 250 connected to the tap, which is desired to be remotely operated and monitored by the user, and household electric appliances 250 connected to the tap, which are actually connected to the control system of FIG. 1.

Modified Example

Though the appliance table 131 and the tap table 132 are separately provided for the description in the aforementioned embodiments, without limitation to an aspect in which they are provided separately, these two tables are able to be integrated into one table.

Further, though the appliance information table 341A and the tap information table 342A are separately provided for the description, without limitation to an aspect in which they are provided separately, these two tables may be integrated into one table. That is, by setting a tap ID and an identifier ID of the household electric appliance 250 to be monitored and operated correspondingly to one piece of appliance information (such as a room name or an appliance name), the appliance information table 341A and the tap information table 342A are able to be integrated into one table. Similarly, in the case of the appliance information table 341B and the tap information table 342B as well, without limitation to an aspect in which they are provided separately, these two tables are able to be integrated into one table.

<Remote Operation and Monitoring of Electric Appliance>

By using the appliance information table of the server 300 and the appliance table of the HEMS controller 100, which are link information, the user is able to acquire, from the air conditioner 200 as an appliance to be controlled, information of its state and power consumption, and acquire, from the taps 231 and 232 as measuring devices, information of power consumption of the connected household electric appliances.

That is, in the control system including the server 300 capable of communicating with the terminal apparatus 400, and the HEMS controller 100 for relaying communication between the server 300 and electric appliances (an appliance to be controlled and measuring devices), the HEMS controller 100 communicates with these electric appliances to acquire information of a state and measured power consumption of an appliance designated by a monitoring property specified in the appliance table 131 (or the tap table 132). The acquired appliance state and power consumption are stored in the appliance table 131 (or the tap table 132) and the appliance information table of the memory 34 in association with an identifier ID of each electric appliance. The HEMS controller 100 transmits information read from the appliance table (the identifier ID and the corresponding state or power consumption information) to the server 300. The server 300 notifies the terminal apparatus 400 of the information received from the HEMS controller 100 as a current state of the electric appliance or measured power consumption.

At this time, the server 300 reads a room name, an appliance name, or the like associated with the identifier ID of the received information from the appliance information tables 341A and 341B (or the tap information tables 342A and 342B) of the memory 34, and applies it to the notification. Based on the notification received from the server 300, the terminal apparatus 400 displays the appliance state or power consumption in association with the appliance name or the room name by means of an image or the like.

Thereby, the user is able to monitor the operation state and the power consumption by associating (linking) the desired electric appliance with electric appliances actually connected to the control system.

In a case of remotely operating the household electric appliance 250, when the user transmits (a desired appliance name and a control command) from the terminal apparatus 400, they are transmitted to the server 300 via the HEMS controller 100. The server 300 searches the tables 341A or 342B based on the appliance name of the received information to acquire the corresponding identifier ID, and generates (identifier ID+control command) to transmit it to the HEMS controller 100. The HEMS controller 100 transmits the control command to the household electric appliance indicated by the identifier ID based on the received information. Thereby, it is possible to monitor and operate the household electric appliance desired by the user by associating (linking) it with electric appliances actually connected to the control system.

Third Embodiment

Further, it is also possible to provide a program for causing the CPU 10 of the HEMS controller 100 and the CPU 30 of the server 300 to execute the operation described in the first embodiment or the second embodiment. As described above, the server 300 is able to be constituted by a typical computer. Therefore, by providing the computer with the program, it is possible to easily construct the present control system by using a general purpose computer. Further, by providing the general purpose computer with the program, it is possible to easily construct the present control system by causing the general purpose computer to function as the HEMS controller 100.

Such a program may be recorded on a computer readable recording medium such as a flexible disk, CD-ROM (Compact Disk-Read Only Memory), a ROM, a RAM, or a memory card attached to the computer, and provided as a program product. Alternatively, the program may be provided being recorded on a recording medium such as a hard disk mounted inside the computer. Further, the program may be provided by downloading through a network.

Note that, the program according to the invention may be realized by calling, from program modules provided as a part of an operating system (OS) of a computer, necessary modules at prescribed timing in a prescribed sequence and executing processing. In that case, the modules are not included in the program itself, and the processing is executed in cooperation with the OS. The program not including such modules may be included in the program according to the invention.

Further, the program according to the invention may be provided being incorporated in a part of a different program. In that case as well, the program itself includes no module included in the different program, and the processing is executed in cooperation with the different program. Such a program incorporated in the different program may be included in the program according to the invention.

The provided program product is installed in a program storage unit such as the hard disk and executed. The program product includes the program itself and the recording medium on which the program is recorded.

[Configuration of Embodiment]

The server 300 includes a terminal-side receiver 303 for receiving, via a first network NTa, information including appliance information (such as an appliance name or a room name) that identifies an electric appliance, from a terminal apparatus 400 operable by a user, an appliance-side receiver 301 for receiving, via a second network NT, information including an identifier (identifier ID) of the electric appliance and information about a state of the electric appliance (such as power on), and a storage unit 302 that stores the appliance information received by the terminal-side receiver 303 and the identifier of the electric appliance, for which it is judged, from the information about the state of the electric appliance received by the appliance-side receiver 301, that the appliance state has been changed, in association with each other, upon reception of trigger information by the terminal-side receiver 303.

The first network NTa is a server-client network in which the terminal apparatus 400 serves as a client and the server 300 serves as a server.

In the control system including the terminal apparatus 400 operated by the user and the server 300, the server 300 includes a terminal-side receiver 303 for receiving, via a first network NTa, from the terminal apparatus 400, information including appliance information (such as an appliance name or a room name) that identifies an electric appliance (such as the household electric appliance 250), an appliance-side receiver 301 for receiving, via a second network NT, information including an identifier (identifiers IDs) of the electric appliance and information about a state of the electric appliance (such as power on), and a storage unit 302 that stores the appliance information received by the terminal-side receiver 303 and the identifier of the electric appliance, for which it is judged, from the information about the state of the electric appliance, received by the appliance-side receiver 301, that the appliance state has been changed, in association with each other, upon reception of trigger information by the terminal-side receiver 303.

In a control method of a control unit (CPU 30) that performs control so that information that identifies an electric appliance and an identifier (identifier ID) of the electric appliance are stored in a memory in association with each other, information including appliance information (such as a room name or an appliance name) that identifies an electric appliance is received via a first network NTa from a terminal apparatus 400 operable by a user, an identifier of the electric appliance and information about a state of the electric appliance (such as power on) are received via a second network NT, and the received appliance information and the identifier of the electric appliance, for which it is judged, from the information about the state of the electric appliance, that the appliance state has been changed, are stored in a memory in association with each other, upon reception of trigger information via the first network NTa.

It should be understood that the embodiments disclosed herein are illustrative and non-restrictive in every respect. The scope of the invention is defined by the scope of the claims, rather than the description above, and is intended to include any modifications within the scope and meaning equivalent to the scope of the claims.

REFERENCE SIGNS LIST 30 server
100 HEMS controller
101 ID acquisition unit
103, 302 storage unit
105 ID transmission unit
131 appliance table
132 tap table
230 tap
241A state data
250 household electric appliance
300 server
301 appliance-side receiver
303 terminal-side receiver
341A, 341B appliance information table
342A, 342B tap information table
400 terminal apparatus

The invention claimed is:

1. A server apparatus, comprising:
a terminal-side receiver for receiving, via a first network, information including appliance information that identifies an electric appliance, from a terminal apparatus operable by a user;
an appliance-side receiver for receiving, via a second network, information including an identifier of the electric appliance and information about a state of the electric appliance;
a communication unit that in response to receiving an operation instruction request from the terminal apparatus, transmits, via the first network, operation instruction data to the terminal apparatus; and
a storage unit that in response to receiving trigger information by the terminal-side receiver, stores the appliance information received by the terminal-side receiver and the identifier of the electric appliance, such that the appliance information is linked to the identifier when, from the information about the state of the electric appliance received by the appliance-side receiver, the appliance state is determined to have been changed.

2. The server apparatus according to claim 1, wherein the first network is a server-client network in which the terminal apparatus serves as a client and the server apparatus serves as a server.

3. A control system including a terminal apparatus operable by a user, a Home Energy Management System (HEMS) apparatus, and a server apparatus, wherein the server apparatus includes:
a terminal-side receiver for receiving, via a first network, information including appliance information that identifies an electric appliance from the terminal apparatus;
an appliance-side receiver for receiving, via a second network, information including an identifier of the electric appliance and information about a state of the electric appliance from the HEMS apparatus in communication with the electronic appliance; and
a storage unit that in response to receiving trigger information by the terminal-side receiver, stores the appliance information received by the terminal-side receiver and the identifier of the electric appliance, such that the appliance information is linked to the identifier when, from the information about the state of the electric appliance received by the appliance-side receiver, the appliance state is determined to have been changed.

4. A control method of a control unit that performs control so that information that identifies an electric appliance and an identifier of the electric appliance are stored in a memory in association with each other, the control method comprising:
receiving, via a first network, information including appliance information that identifies the electric appliance from a terminal apparatus operable by a user;
receiving, via a second network, the identifier of the electric appliance and information about a state of the electric appliance;
receiving, via the first network, trigger information from the terminal apparatus; and
in response to receiving the trigger information, storing, in the memory, the received appliance information and the identifier of the electric appliance, such that the appliance information is linked to the identifier when, from the information about the state of the electric appliance, the appliance state is determined to have been changed.

* * * * *